United States Patent [19]
Tait

[11] Patent Number: 4,610,885
[45] Date of Patent: Sep. 9, 1986

[54] PACKAGING OF A BLOCK OF CHEESE OR OTHER SOFT PRODUCT

[75] Inventor: John A. R. Tait, Keinton Mandeville, England

[73] Assignee: Wincanton Engineering Limited, London, England

[21] Appl. No.: 625,562

[22] Filed: Jun. 27, 1984

[30] Foreign Application Priority Data

Jul. 7, 1983 [GB] United Kingdom ............... 8318442

[51] Int. Cl.$^4$ ................ B65D 5/56; B65D 25/14; B65B 7/28; B65B 31/04
[52] U.S. Cl. ................................... 426/130; 53/432; 53/433; 53/436; 220/462; 220/463; 426/398; 426/404; 426/411; 426/413; 426/414; 426/111; 426/106; 229/43
[58] Field of Search ............... 426/130, 398, 404, 411, 426/413, 111, 106; 220/462, 463; 229/23 C; 53/432-434

[56] References Cited

U.S. PATENT DOCUMENTS

| | | | |
|---|---|---|---|
| 1,254,515 | 1/1918 | Leiman | 220/463 |
| 2,267,320 | 12/1941 | Berch | 220/418 |
| 2,434,756 | 1/1948 | Brooks | 220/463 |
| 2,804,253 | 8/1957 | Brandy | 229/23 C |
| 3,083,889 | 4/1963 | Christensson | 220/462 |
| 3,100,712 | 8/1963 | Meeker et al. | 426/130 |
| 3,137,433 | 6/1964 | Lipschutz et al. | 220/462 |
| 3,695,900 | 10/1972 | Young et al. | 426/129 |
| 3,715,860 | 2/1973 | Esty | 426/418 |
| 3,792,181 | 2/1974 | Mahaffy et al. | 426/129 |
| 3,903,309 | 9/1975 | Mahaffy et al. | 426/129 |
| 3,943,987 | 3/1976 | Rossi | 426/404 |
| 4,169,540 | 10/1979 | Larsson et al. | 220/462 |

FOREIGN PATENT DOCUMENTS

| | | | |
|---|---|---|---|
| 2803419 | 7/1978 | Fed. Rep. of Germany | 220/462 |
| 460803 | 2/1937 | United Kingdom | 229/23 C |
| 1230517 | 5/1971 | United Kingdom | 426/130 |

*Primary Examiner*—Steven Weinstein
*Attorney, Agent, or Firm*—Browdy and Neimark

[57] ABSTRACT

A method of packaging a block of cheese or other soft product, in which the block is enclosed in a cardboard container having a body and a separate lid each lined with sheet material impervious to air and moisture, the container having internal dimensions similar to the external dimensions of the block with the lid engaged against the adjacent face of the block. The lining sheets on the body and lid extend out through the open end of the body of the container to form two endless collars which are sealed together, and the interior of the container is evacuated of air prior to sealing of the lining sheets, so that atmospheric pressure on the lid exerts a comprehensive force on the block of cheese. A reinforcing panel is mounted in a recess in the lid. A stack of such containers has each container arranged with its reinforcing panel upright and perpendicular to the reinforcing panels in the overlying and underlying containers.

13 Claims, 9 Drawing Figures

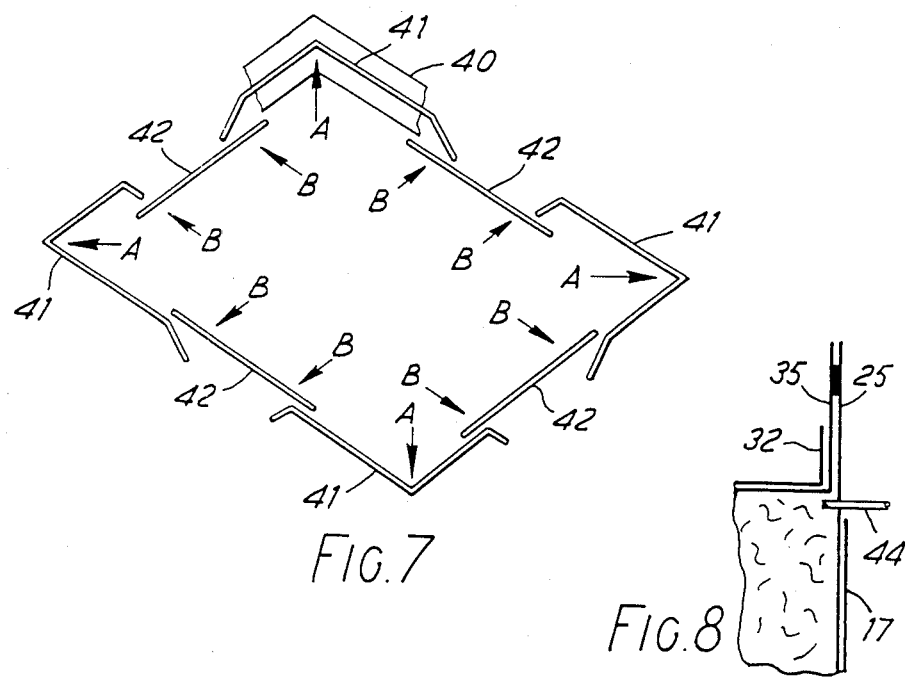
FIG.7
FIG.8
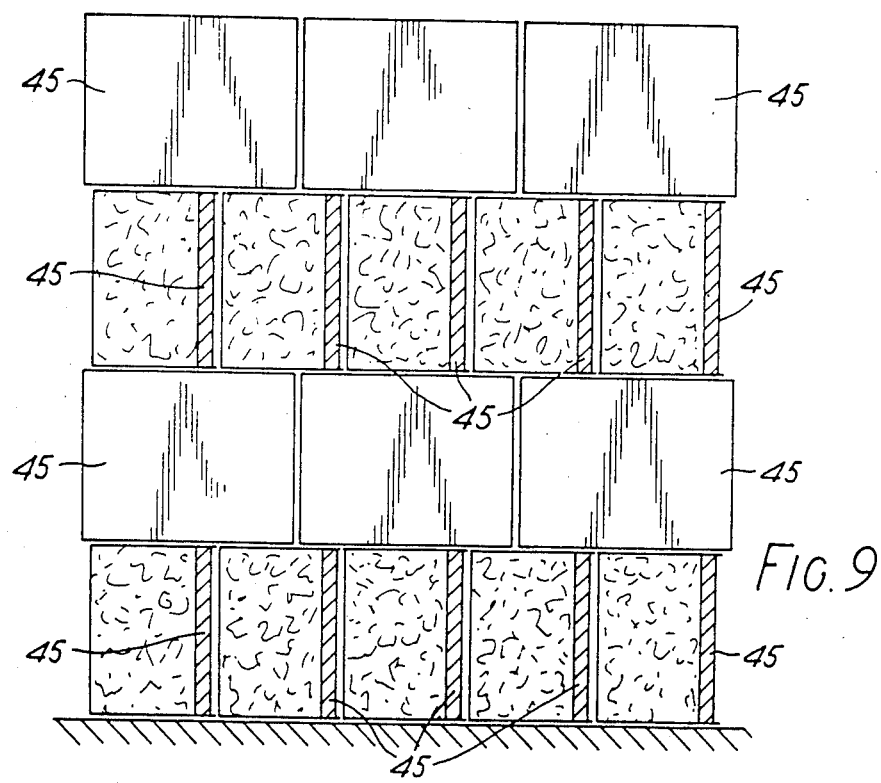
FIG.9

PACKAGING OF A BLOCK OF CHEESE OR OTHER SOFT PRODUCT

This invention relates to the packaging of a block of natural cheese, butter, or other soft product, and is particularly applicable to the packaging, preparatory to maturing, of blocks of natural cheese produced by compressing cheese curd to consolidate the particles of curd.

In the commercial manufacture of hard cheese, it is common practice to package a natural cheese block by wrapping the block completely in a sheet of flexible film-like heat-sealable plastics material which is impervious to air and moisture, evacuating air from between the wrapping and the block and heat-sealing the overlapping portions of the sheet to form a closed bag. The sheet material can conveniently be pre-formed initially into an open-mouthed bag for reception of the block, the bag containing the block placed in a chamber which is then connected to vacuum to evacuate air, and the mouth of the bag heat-sealed while the chamber is under vacuum. The vacuum-wrapped cheese block is then encased in a carton or container to form a cheese pack which is transported to a maturing station where it is stacked and kept for the appropriate time under the required maturing conditions.

This method of packaging cheese has the advantage that access of air to the cheese and accordingly mould formation is prevented. Furthermore the formation of a rind by loss of moisture by evaporation is avoided.

Since however air has been evacuated from the closed bag, atmospheric pressure holds the film-like material of the bag against the surfaces of the cheese block. The surfaces of a cheese block generally have numerous cavities, and the film is drawn into these surface cavities. After maturing, it is necessary to trim cheese from the surfaces of the block to provide a smooth walled block which can be sub-divided into smaller blocks of predetermined size for retail sale.

A cheese block vacuum-wrapped in plastics material can be provided with a smooth finish by enclosing the wrapped block in a thin cardboard carton, compressing the carton containing the wrapped cheese block between rigid slats or panels in a hydraulic or mechanical press, the slats being brought together in compressing the cheese block to form a rigid walled container which completely encloses the cheese block, and then binding the slats together with steel tape while pressed against the carton so that the cheese block is held in the compressed condition after the cheese pack is removed from the press. This method is however labour intensive and since the block must remain packaged in the slats through the maturing period which may be six months the costs of the slats is rather high in large scale manufacture of cheese.

Alternatively, a vacuum-wrapped cheese block can be provided with a smooth finish to the walls of the block by using heat-shrinkable film material for the wrapping and heat shrinking the material after the block has been wrapped. This has the disadvantage however that the tension in the sheet wrapping material tends to round-off the corners of the block and cause bowing of the sides of the block, that is the sides of the block tend to be convex. The cheese block after maturing must then be squared off by trimming cheese from its surfaces to enable the block to be sub-divided into smaller blocks of predetermined size for retail sale.

According to the present invention there is provided a method of packaging a block of natural cheese or other soft product, comprising enclosing the block in a container having a body open at one end thereof and a lid in the open end of the body, the container having internal dimensions similar to the external dimensions of the block with the lid engaged against the adjacent face of the block, and the walls of the container body and lid being substantially impervious to air and moisture, sealing the lid to the body by flexible means which permit a small degree of freedom of movement of the lid into the body of the container, and evacuating air from the interior of the container, whereby the atmospheric pressure on the lid exerts a compressive force on the block.

The present invention enables a block of cheese or other soft product to be packaged by a method which can result in the block having a smooth finish without serious distortion of the shape of the block and with substantially square corners, at a relatively low cost in labour and material. The invention also enables the shape of the block to be retained during the storage period.

In a preferred construction, the body of the container has a frame and a lining of sheet material impervious to air and moisture which is secured to the frame over at least a substantial proportion of the surface thereof, and the lid of the container has a frame and a lining of sheet material impervious to air and moisture which is secured to the frame over at least a substantial proportion of the surface thereof, each lining projecting out of the open end of the body of the container to form an endless collar extending around the periphery of the open end of the container body, and the lid being sealed to the body of the container by sealing the two collars together around their peripheries. The linings on the body of the container and the lid are preferably formed of heat-sealable sheet material.

The body of the container can conveniently be formed from a blank of cardboard or other stiff material and a sheet of flexible film-like material overlying a face of the blank and attached thereto, the sheet having overall dimensions greater than that of the blank, and the blank being foldable to form a frame for the body of the container with the sheet of flexible material forming a lining on the frame and the margins of the sheet projecting out of the open end of the body of the container. Similarly the lid of the container can conveniently be formed from a blank of cardboard or other stiff material and a sheet of flexible film-like material underlying a face of the blank and attached thereto, the sheet having overall dimensions greater than that of the blank, and the blank being foldable to form a frame for the lid of the container with the sheet of flexible material forming a lining on the frame and the margins of the sheet projecting out of the open end of the body of the container when the lid is fitted in the open end of the container body. The sheet of flexible material can conveniently be secured by adhesive to the blank.

The container may be evacuated of air by placing the container prior to sealing in a vacuum chamber, evacuating air from the chamber, and then sealing together the collars of the sheet material on the body and lid of the container. Alternatively, the container may be provided with a duct extending between the interior and exterior of the container, air evacuated from the interior of the container through said duct after the collars of sheet material have been sealed together, and the duct sealed while the interior of the container is at a sub-atmospheric pressure.

The lid is preferably forced against the adjacent face of the block so as to compress the block in the container during evacuation and sealing of the container.

In an arrangement in which the container is formed of foldable material, the containr preferably defines a recess having peripheral dimensions substantially similar to those of a surface of the block, and a reinforcing panel of relatively rigid material is mounted as close fit in the recess. The recess can conveniently be formed in the lid of the container. A plurality of such packages can conveniently be mounted in a stack with each container arranged with its reinforcing panel upright and substantially perpendicular to the reinforcing panels in the overlying and underlying container packages, so that the reinforcing panels form a lattice structure which supports the weight of the containers. This arrangement has the advantage that it enables the blocks to retain their shape while the container packages are stacked during the storage period.

One construction of a container suitable for packaging a rectangular block of cheese in accordance with the method of the invention will now be described, by way of example, with reference to the accompanying drawings, in which:

BRIEF DESCRIPTION OF THE DRAWINGS

FIG. 7 is a diagrammatic view of an arrangement of heat-sealing elements for sealing the lid to the body of the container, FIG. 8 is a detail view of part of the container of FIG. 6 fitted with a duct for extracting air from the interior of the container, and FIG. 9 is an elevation view of a stack of sealed containers packaging cheese blocks as illustrated in FIG. 6, alternate layers of the containers being shown in section to illustrate the arrangement of the containers.

Figure 4:
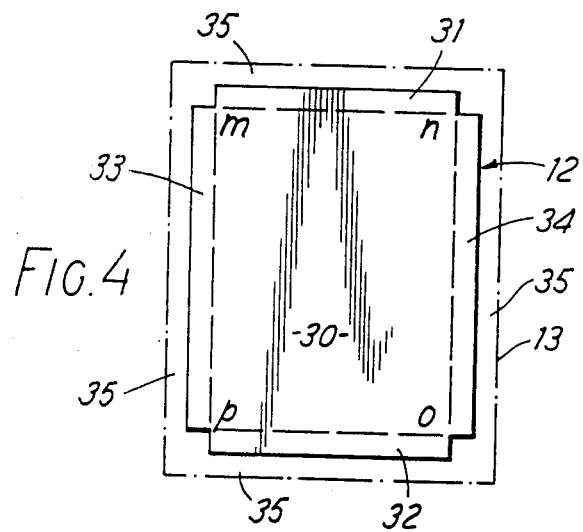
FIG. 4 is a plan view of a blank for forming the frame of the lid of the container, the blank overlying a lining sheet shown in chain-lines.

The container shown in the drawings comprises a blank 10 (FIG. 1) foldable to form the frame of the body of the container, a lining sheet 11 (FIG. 2) overlying the blank 10 and glued thereto, a blank 12 (FIG. 4) foldable to form the frame of the lid of the container, and a lining sheet 13 underlying the blank 12 and glued thereto. The blanks 10, 12 are made of any suitable firm material which is capable of being folded and can conveniently be made of corrugated cardboard. The sheets 11, 13 are made of flexible film-like heat-sealable material which is impervious to air and moisture, and can conveniently be a laminate of sheets of polyethylene and nylon bonded together. For convenience, the lining sheet 11 is shown as transparent so that the outline of the blank 10 is visible in the plan view in FIG. 2. The nylon sides of the lining sheets are glued to the blanks.

Figure 1:
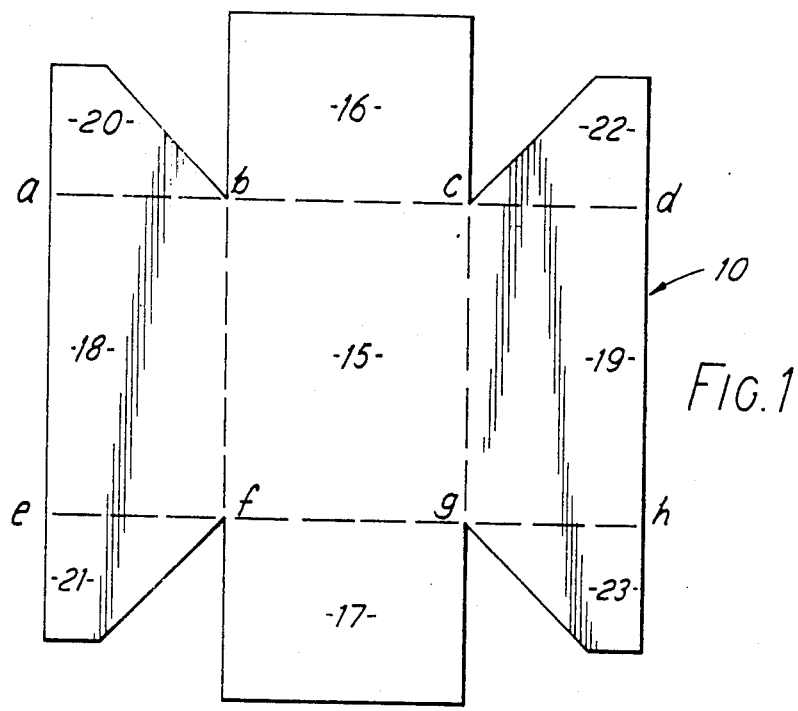
FIG. 1 is a plan view of a blank for forming the frame of the body of the container.
Figure 2:
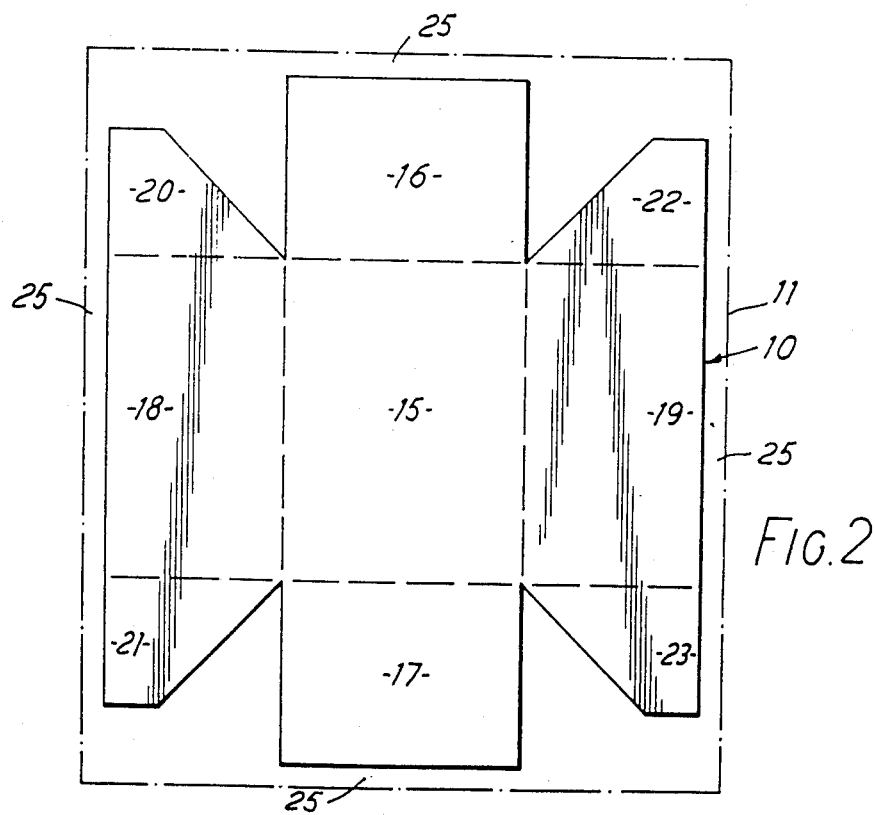
FIG. 2 is a plan view of the blank of FIG. 1 overlaid with a transparent lining sheet shown in chain-lines.

As shown in FIG. 1, the blank 10 is scored along the lines a-b-c-d, e-f-g-h, b-f and c-g to sub-divide the blank into a rectangular centre portion adapted to form a base 15 to the container, two rectangular end portions adapted to form two end walls 16, 17 of the container, two rectangular side portions adapted to form two side walls 18, 19 of the container, two tabs 20, 21 at opposite ends of the side wall 18, and two tabs 22, 23 at opposite ends of the side wall 19. Each of the tabs 20-23 has a base extending the full length of the score line at the junction with its associated side wall, one side edge aligned with the outer edge of its associated side wall in the plan view of the blank shown in FIG. 1, an opposing side edge inclined at 45 degrees to the score line, and a further edge at the end of the tab which is parallel to the score line.

The score lines b-c and f-g permit the end walls 16, 17 to be folded relative to the base 15 into an upright position, and the score lines b-f and c-g permit the side walls 18, 19 together with the tabs 20-23 to be folded relative to the base 15 into an upright position. The heights of the end walls, the side walls and the tabs are the same so that, when they are in their upright position, their upper edges are all at the same level. The score lines a-b, c-d, e-f, g-h permit the tabs to be folded behind the end walls, and the distance between the end of each tab and the score line at the base of the tab is equal to half the width of the end walls 16, 17 so that the ends of the tabs 20, 22 abut one another and the ends of the tabs 21, 23 abut one another when the tabs are folded behind the end walls as shown in FIG. 3.

The lining sheet 11 is rectangular and has overall dimensions greater than the overall dimensions of the blank 10, the sheet being arranged symmetrically on the blank so that its margins 25 project beyond the outer edges of the end walls and side walls of the blank 10. These margins 25 can conveniently have a width of approximately 25 mm.

Figure 3:
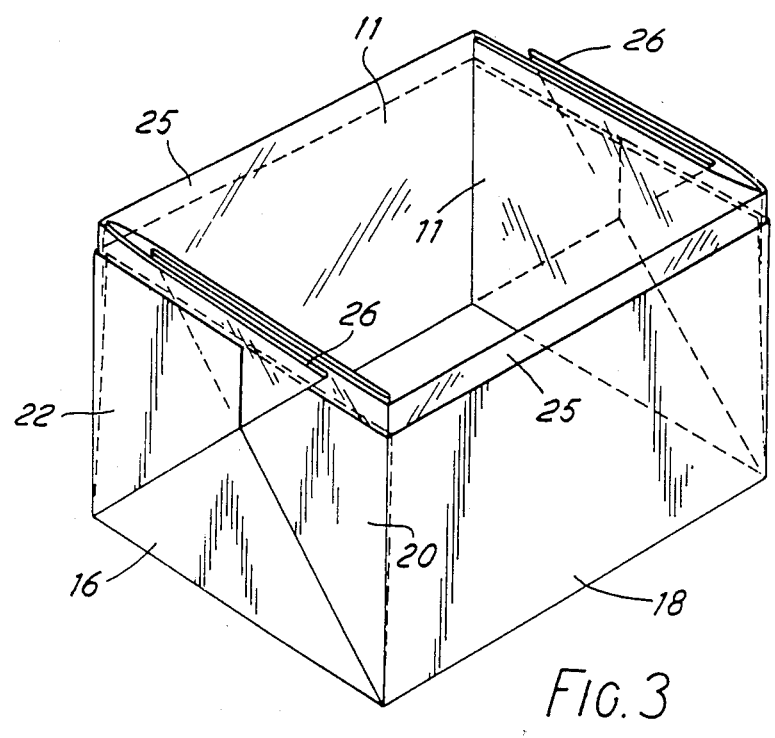
FIG. 3 is a perspective view on a larger scale of the blank and lining of FIG. 2 folded to form the body of the container.

The blank 10, with the lining sheet 11 glued thereto, is formed into the body of the container by folding up the side and end walls of the blank and folding the tabs behind the end walls as described above, the portions of the lining sheet 11 extending between the end walls 16, 17 and the tabs 20-23 forming folds 26 as shown in FIG. 3. The tabs 20-23 are secured against the outside surfaces of the end walls 16, 17 by adhesive or adhesive tape. The margins 25 of the lining sheet project upwardly from the open top of the container body with the edges of the sheet 11 all at the same level.

The blank 12 for the frame of the lid is scored along the lines m-n, n-o, o-p, p-m, to sub-divide the blank into a rectangular centre portion adapted to form a base 30 to the lid, two rectangular end portions adapted to form two end walls 31, 32 of the lid, and two rectangular side portions adapted to form two side walls 33, 34 of the container. The lining sheet 13 is rectangular and has overall dimensions greater than the overall dimensions of the blank 12, the sheet being arranged symmetrically on the blank so that its margins 35 project beyond the outer edges of the end walls and side walls of the blank 12. These margins 35 have the same width as the margins 25 of the lining sheet 11.

The blank 12, with the lining sheet 13 glued to the underside thereof, is formed into the lid of the container by folding the end walls 31, 32 and the side walls 33, 34 into an upright position, with the portions of the lining sheet 13 extending between the end walls and side walls forming folds (not shown). The side and end walls then cooperate with the base of the lid to form a recess 36 in the top of the lid. The margins 35 of the lining sheet 13 project upwardly above the upper edges of the side and end walls of the lid, with the edges of the sheet 13 all at the same level. The lid is dimensioned to be a close sliding fit in the open top of the container body.

Figure 5:
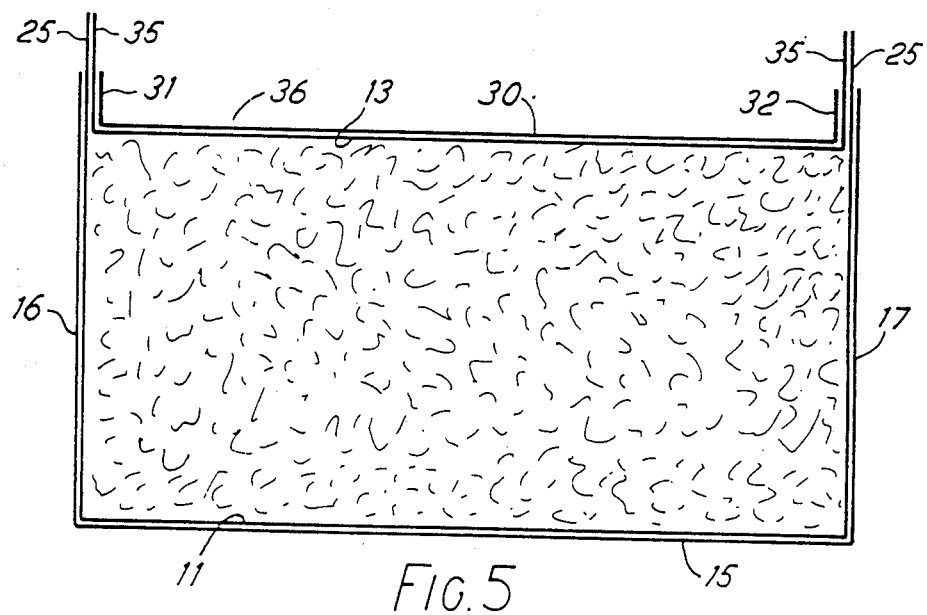
FIG. 5 is a cross-sectional elevation view of a block of cheese inside the container formed from the body and lid of FIGS. 3 and 4.

The container is designed to have internal dimensions similar to the external dimensions of the block of cheese to be packaged. The cheese block can conveniently be fitted inside the body of the container by placing the block on a platform, lowering the container body in an inverted position over the top of the cheese block, and then turning the container body with the cheese block inside it into the upright position with the open end uppermost. The lid is then fitted into the open top of the container body so that it rests on the top of the cheese block, as shown in FIG. 5. The side and end walls of the lid are dimensioned so that, when the lid is supported on the top of the cheese block, the margins 25, 35 of the lining sheets project upwards from the top of the container and are arranged alongside one another in the form of two endless collars extending around the periphery of the lid of the container. The cheese block is then completely enclosed in the lining sheets of the container with the polyethylene sides of the lining sheets facing towards the cheese block and also facing towards each other at the margins of the sheets.

The cheese block may of course be encased in the container by any other suitable method. For example the cheese block may be placed on the part of the blank and lining which is to form the base of the container, and the blank and lining folded around the cheese block. Alternatively, the lid may be placed on a platform in an inverted position, the cheese block placed on the lid, the blank and lining for the body of the container folded around the cheese block, and the lid and body of the container together with the cheese block turned into an upright position.

The container is preferably sealed in accordance with the method of the invention by placing the container within a vacuum chamber and then drawing a vacuum in the chamber. When full vacuum is achieved the lid is pressed downwards using light mechanical pressure, and the two collars formed by the margins 25, 35 of the lining sheets are clamped together and heat-sealed by electrically heated elements. The vacuum is then released and the container removed from the chamber. Most of the air will then have been removed from between the cheeseblock and the walls of the container, with the result that atmospheric pressure will force the lid firmly downwards onto the top of the cheese block. Under this compressive force the cheese will spread laterally outwards and take the shape of the interior of the container.

Vacuum chambers and equipment in the chambers for heat-sealing plastics bags are well known in the art. FIG. 7 however shows a diagrammatic arrangement of heat-sealing equipment which is particularly suitable for use in sealing the margins 25, 35 of the lining sheets in the container shown in the drawings. The equipment of FIG. 7 is mounted inside the lid of the vacuum chamber and comprises an anvil 40 in the form of a rectangular loop arranged to surround the margins 25, 35 of the lining sheets on a container inside the vacuum chamber (only a corner of the anvil 40 is shown in FIG. 7), a set of electrically heated corner elements 41, and a set of electrically heated intermediate elements 42. Each corner element 41 comprises a V shaped bar adapted to clamp the margins 25, 35 against a corner of the anvil, the central portion of the bar being horizontal and the end portions being inclined downwardly. Each intermediate element 42 comprises a horizontal bar extending along the anvil between two of the corners thereof. Mechanism, not shown, is operable to move simultaneously all the corner elements 41 horizontally outwards in the direction of the arrows A so as to clamp the margins 25, 35 against the corners of the anvil and heat-seal the clamped portions of the margins together. The mechanism then retracts and lifts the corner elements 41 away from the margins 25, 35, and subsequently moves the intermediate elements 42 horizontally outwards in the direction of the arrows B so as to clamp the margins 25, 35 against the centre portions of the anvil and heat seal the remaining portions of the margins. The lines of seal formed by the intermediate elements 42 intersect the lines of seal formed by the end portions of the corner elements 41 so as to effect a complete seal around the full periphery of the margins 25, 35.

The apex of each corner element 41, and the corresponding corner of the anvil, preferably have a small radius of for example 6 mm to facilitate welding of the margins of the sheets at the corners thereof.

A block of cheese may be packaged in a container in accordance with the method of the invention by providing the container with one or more ducts extending between the interior and exterior of the container and extracting air through the ducts after the collars formed by the margins 25, 35 of the lining sheets have been sealed together so as to create a sub-atmospheric pressure inside the container, the ducts then being sealed while the interior of the container is at the sub-atmospheric pressure. Each duct can conveniently be a small tube which extends between the two collars formed by the margins 25, 35, the margins being sealed around the wall of the tube when the margins are sealed together. Alternatively, each duct may be a small tube which extends through and is sealed within a small opening in one of the lining sheets as shown at 44 in FIG. 8. The duct may be a hypodermic needle which pierces one of the lining sheets. Conveniently, a small strip is cut away from the open end of the body of the container to expose the lining at the junction between the lid and the body of the container. After the air has been extracted from the container through the needle, the needle is withdrawn and the puncture in the lining sealed immediately while the interior of the container is at a sub-atmospheric pressure.

The lining sheets 11, 13 may be a laminate consisting of a sheet of nylon sandwiched between sheets of polyethylene, or the lining sheets may be made only of polyethylene. The lining sheets 11, 13 may however be made of any other suitable material which permits the sheets to be sealed together.

Figure 6:
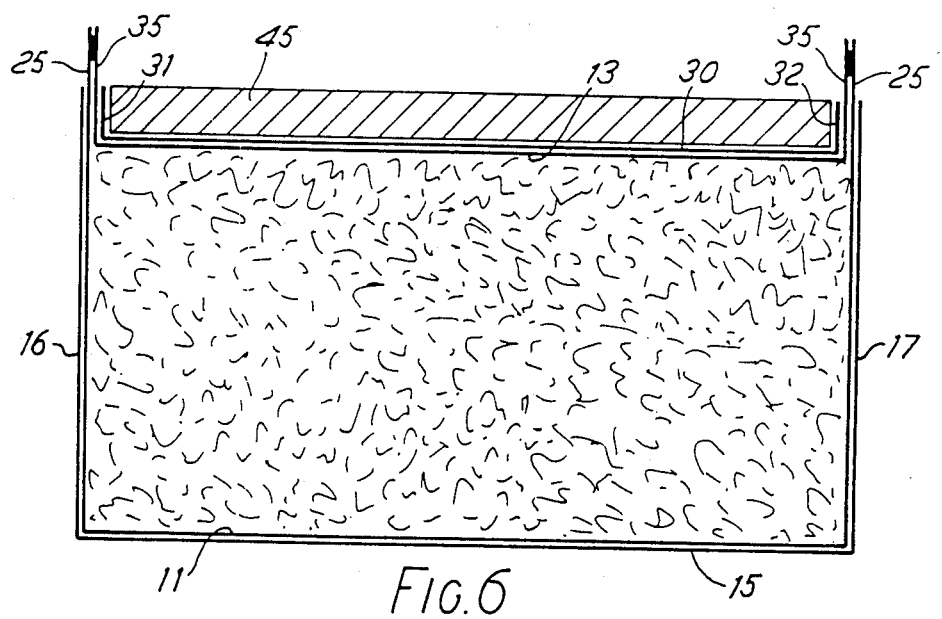
FIG. 6 is a view similar to FIG. 5 but showing the lid sealed to the body of the container to form a sealed cheese pack, and a reinforcing panel on the lid.

The lid of the sealed container is preferably reinforced by a rigid panel 45 mounted as a close fit in the recess 36 in the top of the lid, as shown in FIG. 6. The panel can conveniently be made of wood, plywood, blockboard or a suitable plastics. A plurality of such reinforced containers may then be stacked in layers for storage purposes as shown in FIG. 9, with each container arranged so that its reinforcing panel is in an upright position and substantially perpendicular to the reinforcing panels of the overlying and underlying containers. In this way the reinforcing panels form a lattice structure which supports the weight of the containers. In FIG. 9 the containers in the bottom layer and the third layer from the bottom are shown in section, and the containers in the other two layers are shown with their lids and the reinforcing panels facing outwards.

If desired, the bottom of the sealed container may also be reinforced by a rigid panel. Alternatively, the two side walls or the two end walls of the container may be reinforced by rigid panels, and the containers stacked so that all the panels form a lattice structure with each panel in an upright position and substantially perpendicular or inclined to the reinforcing panels of the overlying and underlying containers.

After the maturing period is completed, the reinforcing panels are removed from the containers for re-use. The containers are not re-usable and can conveniently be used as the packaging for the cheese blocks when the cheese is distributed to wholesale or retail outlets.

The container may be of any convenient shape to suit the configuration of the block of cheese or other produce being packaged, for example a cylindrical container would be required for a cylindrical block of cheese. Also the lid may be adapted to form any desired part of the container.

I claim:

1. A package containing a block of natural cheese or other soft product in a sealed container in which the container has internal dimensions similar to the external dimensions of the block and comprises a body which is open at one end thereof and a separate lid of a size to be sliding fit in the open end of the body, wherein the body and the lid each have an internal lining formed of flexible sheet material which is substantially impervious to air and moisture, the sheet material being secured to the inside surfaces of the body and the lid over at least a substantial proportion of said surfaces, and the sheet material on the body and on the lid extending out of the open end of the body to form two endless collars extending around the periphery of the open end of the body the two collars are sealed together around the full periphery thereof to seal the container such that the position of the seal will permit a small degree of freedom of movement of the lid into the body, and the interior of the sealed container is at a sub-atmospheric pressure so that the external atmospheric pressure forces the lid against the block of cheese and causes the cheese to spread laterally outwards and take the shape of the interior of the container.

2. A package as claimed in claim 1, wherein said sheet material is a laminate consisting of a sheet of nylon sandwiched between sheets of polyethylene.

3. A package as claimed in claim 1, wherein said body and said lid each comprises a frame formed of stiff foldable material, and the linings on the body and lid comprise sheets of film-like material glued to the surfaces of the frames forming the inside surfaces of the container.

4. A package as claimed in claim 3, wherein the frame of the lid comprises a base and walls integral with the periphery of the base and substantially perpendicular thereto, the lid being a close sliding fit in the open end of the body with the walls of the lid projecting in the direction away form the block so as to define a recess in the lid, said recess being accessible from the entering of the container and a reinforcing panel of relatively rigid material is mounted as a close fit in the recess in the lid.

5. A plurality of packages as claimed in claim 4 and mounted in a stack, wherein the packages are arranged in the stack with each package having its reinforcing panel upright and substantially perpendicular to the reinforcing panels in the overlying and underlying packages, so that the reinforcing panels form a lattice structure which supports the weight of the packages.

6. A package as claimed in claim 3, wherein the sheet material forming the internal linings on the body and the lid comprises a laminate of polyethylene and nylon, the nylon side of the linings being glued to the body and lid respectively.

7. A method of packaging a block of natural cheese or other soft product in a container having internal dimensions similar to the external dimensions of the block, wherein the container comprises a body open at one end thereof and a separate lid of a size to be a sliding fit in the open end of the body, the body and the lid each having an internal lining formed of flexible sheet material which is substantially impervious to air and moisture and which is secured to the inside surfaces of the body and the lid respectively over a substantial proportion of said surfaces, the sheet material forming the lining on the body projecting out of the open end of the body to form a flexible endless collar extending around the periphery of the open end of the body, and the sheet material forming the lining on the lid projecting beyond the periphery of the lid to form a flexible endless collar around the lid, the method including the steps of enclosing the block in the container with the lid engaged against the block and the collars on the body and the lid projecting out of the open end of the body, evacuating air from the interior of the container, and while maintaining said vacuum, sealing the two projecting collars together around the full periphery thereof so as to seal the container, with the position of the seal being such that the sealed collars permitting a small degree of freedom of movement of the lid into the body of the evacuated container and forcing the cheese to spread laterally outward and take the shape of the interior of the container.

8. A method as claimed in claim 7, wherein the container is provided with a duct extending between the interior and exterior of the container, air is evacuated from the interior of the container through said duct, after the collars of sheet material have been sealed together, and the duct sealed while the interior of the container is at sub-atmospheric pressure.

9. A method as claimed in claim 7, including the step of forcing the lid against the adjacent face of the block so as to compress the block in the container during evacuation and sealing of the container.

10. A method as claimed in claim 7, in which the linings on the body of the container and the lid are formed of heat-sealable sheet material, wherein said collars are sealed together by application of heat while the interior of the container is at a sub-atmospheric pressure.

11. A method as claimed in claim 7, wherein the body of the container is formed from a blank of cardboard or other stiff material and a sheet of flexible film-like material substantially impervious to air and moisture, the sheet overlying a face of the blank and attached thereto over at least a substantial proportion of said face, and the sheet having overall dimensions greater than that of the blank, and the blank being foldable to form a frame for the body of the container with the sheet of flexible material forming a lining on the frame and the margins of the sheet projecting out of the open end of the body of the container, and the lid of the container is formed from a blank cardboard or other stiff material and a sheet of flexible film-like material substantially impervious to air and moisture, the sheet underlying a face of the blank and attached thereto over at least a substantial proportion of said face, and the sheet having overall dimensions greater than that of the blank, the blank being foldable to form a frame for the lid of the container with the sheet of flexible material forming a lining on the frame and the margins of the sheet projecting out of the open end of the body of the container when the lid is fitted in the open end of the container, the margins of the two sheets forming said endless flexible collar being sealed together.

12. A method as claimed in claim 11, wherein the sheets of flexible material are secured by adhesive to their respective blanks.

13. A method as claimed in claim 7, wherein air is evacuated from the interior of the container by placing the container in a vacuum chamber, evacuating air from the chamber, and then sealing together the collars fo the sheet material on the body and lid of the container while the container is in the evacuated chamber.

* * * * *